(12) United States Patent
Khanna

(10) Patent No.: US 8,151,271 B2
(45) Date of Patent: Apr. 3, 2012

(54) LOAD BALANCING ALGORITHM

(76) Inventor: Abhishek Khanna, Elmsford, NY (US)

( * ) Notice: Subject to any disclaimer, the term of this patent is extended or adjusted under 35 U.S.C. 154(b) by 1236 days.

(21) Appl. No.: 11/772,126

(22) Filed: Jun. 30, 2007

(65) Prior Publication Data

US 2008/0052723 A1    Feb. 28, 2008

(51) Int. Cl.
*G06F 9/46* (2006.01)
(52) U.S. Cl. ......... 718/105; 718/100; 718/102; 718/104
(58) Field of Classification Search ................. 718/105, 718/100, 102, 104
See application file for complete search history.

(56) References Cited

U.S. PATENT DOCUMENTS

| | | | | |
|---|---|---|---|---|
| 6,076,174 | A * | 6/2000 | Freund | 714/47.3 |
| 7,480,913 | B2 * | 1/2009 | Buco et al. | 718/105 |
| 2003/0191795 | A1 * | 10/2003 | Bernardin et al. | 709/105 |
| 2005/0055697 | A1 * | 3/2005 | Buco et al. | 718/105 |
| 2005/0065826 | A1 * | 3/2005 | Baker et al. | 705/7 |
| 2008/0184241 | A1 * | 7/2008 | Headrick et al. | 718/102 |

OTHER PUBLICATIONS

Zomaya et al. "Observations on using genetic algorithms for dynamic load-balancing", Sep. 2001, IEEE Transactions on Parallel and Distributed Systems, pp. 899-911.*
Attiya et al. "Two Phase Algorithm for Load Balancing in Heterogeneous Distributed Systems", Feb. 11-13, 2004, pp. 434-439.*

* cited by examiner

*Primary Examiner* — Emerson Puente
*Assistant Examiner* — Willy W Huaracha

(57) ABSTRACT

A heuristic algorithm for solving a load balancing problem that carries out scheduling of plurality of tasks in two phases. In the first phase some tasks of the plurality of tasks are assigned to resources, they are best on, on a per resource basis and in the second phase resources are chosen for the remaining tasks of the plurality of tasks such that the length of the schedule is minimized.

2 Claims, No Drawings

LOAD BALANCING ALGORITHM

BACKGROUND OF THE INVENTION

Load balancing is the problem of assigning tasks to a plurality of resources in a way such that the assignment is optimal in some sense. This problem has been of significant industrial importance where jobs, that require same or different amount of time on various machines, have to be assigned to machines, to balance the load, such that the maximum amount of time taken to complete all the tasks is minimized. An additional condition of this problem is that every job, mentioned above, is assigned to only one machine for its completion.

SUMMARY OF THE INVENTION

The present invention relates to a heuristic algorithm for solving a load balancing problem that carries out scheduling of plurality of tasks in two phases. In the first phase some tasks of the plurality of tasks are assigned to resources, they are best on, on a per resource basis and in the second phase resources are chosen for the remaining tasks of the plurality of tasks such that the length of the schedule is minimized.

DETAIL DESCRIPTION OF THE PREFERRED EMBODIMENT

For the explanation of the heuristic algorithm let us consider a simple example. Table 1 shows a table of completion times of tasks on their respective resources. Each row of the table corresponds to a task and each column of the table corresponds to a resource. The value of each cell in the table corresponds to time required by a task for its completion on its respective resource. "Inf" means that the resource is unavailable for its corresponding task.

TABLE 1

| 10 | 20 | Inf |
|----|----|-----|
| 30 | 10 | 20 |
| Inf | 10 | 10 |
| 50 | 20 | 30 |
| 20 | 40 | 60 |
| 30 | 20 | 20 |
| 10 | 10 | 20 |
| 40 | 30 | 10 |
| 10 | 20 | 30 |
| Inf | Inf | 20 |

The description of the two phases of the heuristic load balancing algorithm is given below:

Phase 1

Step 1: In this step we find minimum time required to complete a task, sum up minimum time values of all the tasks and divide this sum of minimum time values by number of resources. The maximum of average of sum of minimum completion times and the maximum of the minimum completion times is taken as the lower bound of schedule. As far as the example is concerned, the minimum values of the rows are highlighted below in Table 2.

TABLE 2

| 10 | 20 | Inf |
|----|----|-----|
| 30 | 10 | 20 |
| Inf | 10 | 10 |
| 50 | 20 | 30 |
| 20 | 40 | 60 |
| 30 | 20 | 20 |
| 10 | 10 | 20 |
| 40 | 30 | 10 |
| 10 | 20 | 30 |
| Inf | Inf | 30 |

The sum of the highlighted minimum values is 150 and dividing that by the number of resources (equal to 3) we get 50. In this case the average of the sum of minimum completion times computed above is 50. The maximum of the minimum completion times highlighted in the table above is 30. Hence the lower bound of the schedule is MAX(50, 30)=50.

Step 2: Next we highlight the minimum completion times of every task and sum up the minimum completion times for each resource. The minimum completion time values of every task are highlighted in Table 3 below. The sum of the minimum completion time values for all the resources is {50, 70, 60}.

TABLE 3

| 10 | 20 | Inf |
|----|----|-----|
| 30 | 10 | 20 |
| Inf | 10 | 10 |
| 50 | 20 | 30 |
| 20 | 40 | 60 |
| 30 | 20 | 20 |
| 10 | 10 | 20 |
| 40 | 30 | 10 |
| 10 | 20 | 30 |
| Inf | Inf | 20 |

Step 3: Now we sort the columns of the table in increasing order of completion time sum values computed above. If two columns have the same completion time sum then the column having more variation of values comes before the column having less variation. In the example, based on the sorting criterion mentioned above, we swap columns 2 and 3 to get the sum of completion time values as {50, 60, 70} as shown in Table 4. The two values in brackets besides the completion time value in each cell are the (Task Id, Resource Id) of the original table, Table 1.

TABLE 4

| 10 (1, 1) | Inf (1, 3) | 20 (1, 2) |
|-----------|------------|-----------|
| 30 (2, 1) | 20 (2, 3) | 10 (2, 2) |
| Inf (3, 1) | 10 (3, 3) | 10 (3, 2) |
| 50 (4, 1) | 30 (4, 3) | 20 (4, 2) |
| 20 (5, 1) | 60 (5, 3) | 40 (5, 2) |
| 30 (6, 1) | 20 (6, 3) | 20 (6, 2) |
| 10 (7, 1) | 20 (7, 3) | 10 (7, 2) |
| 40 (8, 1) | 10 (8, 3) | 30 (8, 2) |
| 10 (9, 1) | 30 (9, 3) | 20 (9, 2) |
| Inf (10, 1) | 20 (10, 3) | Inf (10, 2) |

Step 4: In this step we create a separate table of all the minimum values where minimum values of each column are sorted in increasing order of their completion time values. In a column if two cells have the same value then the cell of the row having less number of infinity values comes above a cell of a row having more number of infinity values and if the number of infinity values is also the same then the cell of the row having minimum completion time sum comes above the cell of the row having larger completion time sum. Table 5 with sorted minimum values is shown below.

TABLE 5

| 10 (7, 1) | 10 (8, 3)  | 10 (7, 2) |
|-----------|------------|-----------|
| 10 (9, 1) | 10 (3, 3)  | 10 (2, 2) |
| 10 (1, 1) | 20 (6, 3)  | 10 (3, 2) |
| 20 (5, 1) | 20 (10, 3) | 20 (6, 2) |
|           |            | 20 (4, 2) |

Step 5: After obtaining table 5, in the previous step, with sorted minimum values, we proceed on a column by column basis from left to right. We pop off values from the end of the column we are considering and assign popped off tasks to their respective resources. We should only pop off values from the end of a column till the sum of popped off values of a column is less than or equal to the lower bound of the schedule we computed before. When we pop off values from the bottom of the table obtained in the previous step and schedule the task on the respective resource then we should mark that task as assigned. In the case of this example the lower bound of the schedule and the cut-off limit for popping off values from the bottom of each column is 50. According to data in Table 5 the assignment of tasks to resources is in the order given as follows: (5, 1), (1, 1), (9, 1), (7, 1), (10, 3), (6, 3), (3, 3), (4, 2), (2, 2). Notice that after task 3 is assigned to resource 3 the sum of popped off values (20+20+10) in that column equals to the lower bound hence we do not pop off the next value 10 in column 2. Instead we start popping off values from column 3. Also note that after scheduling task 4 to resource 2 we pop off the next cell value without scheduling task 6 to resource 2 because task 6 was earlier scheduled to resource 3 and marked as assigned.

Step 6: In this step find all the tasks that are yet to be scheduled. In the example, at the end of previous step, all the tasks except for task 8 are assigned. Table 6 below shows the original Table 1 where tasks assigned to their respective resources are highlighted.

TABLE 6

| 10  | 20  | Inf |
|-----|-----|-----|
| 30  | 10  | 20  |
| Inf | 10  | 10  |
| 50  | 20  | 30  |
| 20  | 40  | 60  |
| 30  | 20  | 20  |
| 10  | 10  | 20  |
| 40  | 30  | 10  |
| 10  | 20  | 30  |
| Inf | Inf | 20  |

This completes phase 1 of the load balancing algorithm. Next phase is scheduling based on minimization of the length of the schedule.

Phase 2

Step 1: After phase 1 we compute the total length of the schedule on each resource by summing up the cell values of assigned tasks in the respective columns. Also, we remove all those rows whose corresponding tasks have been scheduled on some resource. In the example the length of the schedule on the resources is {50, 30, 50} and after removing rows that have tasks already assigned to resources we are just left with task 8 as shown in Table 7.

TABLE 7

| 40 | 30 | 10 |
|----|----|----|

Step 2: We sort the rows of the table of unassigned tasks according to decreasing completion time sum. A row with more "Inf" is considered to have a higher sum than a row with less number of "Inf". If two rows have the same number of "Inf" then the row with a greater sum of values comes above a row with lesser number of values. Once the sorting is done we go from top to bottom of the table of unassigned tasks. We pick a resource for the current task such that the length of the schedule on a resource is minimized. If more than one completion time minimizes the total length then the smallest completion time minimizing the total length is chosen. In the case of the example both completion times 30 and 10 of Table 7 minimize the length of schedule with the minimum length in both cases being 60 (30+30 or 50+10). However because 10 is less than 30 therefore task 8 is assigned to resource 3.

This completes phase 2 of the load balancing algorithm that results in all tasks getting assigned to a resource. The final solution to the scheduling problem in this example by the load balancing algorithm is shown below in Table 8.

TABLE 8

| 10  | 20  | Inf |
|-----|-----|-----|
| 30  | 10  | 20  |
| Inf | 10  | 10  |
| 50  | 20  | 30  |
| 20  | 40  | 60  |
| 30  | 20  | 20  |
| 10  | 10  | 20  |
| 40  | 30  | 10  |
| 10  | 20  | 30  |
| Inf | Inf | 20  |

The invention claimed is:

1. A two phase heuristic method of optimization for a static load balancing problem,
    wherein the first phase comprises:
        determining a lower bound of a schedule, wherein the lower bound of the schedule is taken as a function of an average of the minimum task completion time values and the maximum of the minimum task completion time values;
        assigning at least some of a plurality of tasks to resources depending on the lower bound of the schedule, wherein the at least some of a plurality tasks are assigned to the resources, they are best on, on a per resource basis; and
    wherein the second phase comprises:
        identifying all remaining tasks that were not assigned during the first phase;
        sorting the remaining tasks, in the order of decreasing sum of task completion time values; and
        assigning each of the remaining tasks to the resources such that the length of the schedule is minimized.

2. The two phase heuristic method of claim 1, further comprising: handling those tasks that can be processed by all resources as well as those tasks that can be processed by a few and not by all resources.

* * * * *